United States Patent [19]

Watt

[11] 4,233,801
[45] Nov. 18, 1980

[54] APPARATUS AND PROCESS FOR THE MANUFACTURE OF DISPOSABLE THERMOMETERS

[75] Inventor: William E. R. Watt, Barto, Pa.
[73] Assignee: Ashley-Butler, Inc., Somerville, N.J.
[21] Appl. No.: 929,402
[22] Filed: Jul. 31, 1978
[51] Int. Cl.³ .............................................. B65B 47/02
[52] U.S. Cl. ........................................ 53/453; 53/131; 53/559
[58] Field of Search .......................... 53/453, 559, 131

[56] References Cited

U.S. PATENT DOCUMENTS

| 3,464,182 | 9/1969 | Nichols | 53/559 |
| 4,012,888 | 3/1977 | Nichols | 53/559 X |

FOREIGN PATENT DOCUMENTS

| 650163 | 2/1951 | United Kingdom | 53/559 |

Primary Examiner—Travis S. McGehee

[57] ABSTRACT

Apparatus and method for making disposable thermometers of a laminated construction containing an array of liquid-crystal droplets, requiring precise registration of the stretchable substrate layer, the droplets and the temperature markings, wherein the substrate film web from which the thermometers are formed is provided with wide margins for handling in the forming machine to provide strength and avoid stretching and heat deformation. The substrate film web is precisely directed through the machine by suitable guide members and is held at the marking, filling, and heat-seal processing stations by suitable vacuum chucks, the chuck at the heat-sealing station being particularly adapted for cooling the web to avoid unwanted heating of the crystal droplets. A cam-operated transporter is used for precisely indexing the movement of the film.

16 Claims, 6 Drawing Figures

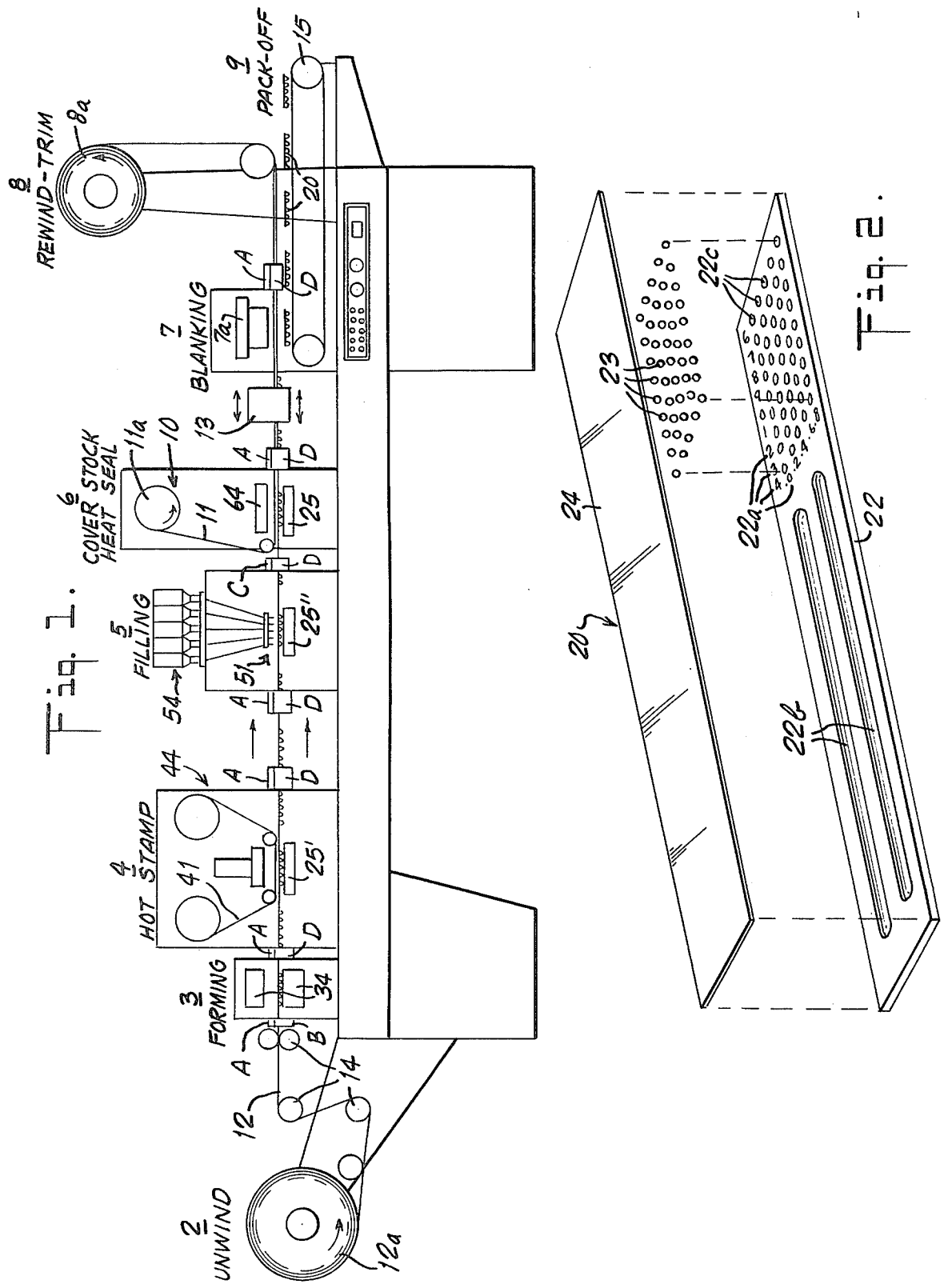

APPARATUS AND PROCESS FOR THE MANUFACTURE OF DISPOSABLE THERMOMETERS

BACKGROUND OF THE INVENTION

The present invention relates to the manufacture of disposable liquid-crystal-containing thermometers and, more particularly, to a method and means for producing and maintaining precise registration between the various layers and parts of the thermometer during manufacture.

Form-fill-seal machines are well known and commercially obtainable for the manufacture of blister packs wherein a product is packaged in a laminated carton usually of a transparent plastic facing with a backing layer of cardboard or such having any necessary identifying printing thereon. Such machines generally operate in such manner that the formed blisters of plastic are intermittently fed in a continuous web, and are filled while advancing with a product such as a number of tablets. After filling, the package is closed by heat-sealing the printed backing, also fed as a continuous web, onto the blister facing. The formed cartons are punched out of the laminated web and conveyed away while the remaining web material is wound onto a salvage mechanism.

Ordinarily, a great deal of precision in disposing and attaching the various components of the pack is not required in such machines. Thus, articles requiring precise positioning of the components during manufacture cannot be readily produced on such machines.

The present invention is directed to providing a form-fill-seal type machine which can be used to manufacture precision laminated products and in particular, disposable liquid-crystal-containing thermometers.

SUMMARY OF THE INVENTION

Thermometers of the type to be manufactured with the present invention comprise a substrate layer provided with an array of dimples into which a corresponding array of small liquid-crystal droplets must be accurately deposited and subsequently sealed with a cover layer and which must be marked with suitable indicia correlating an indication of the imposed temperature with any change of color in the droplets. Since the substrate layer is of a stretchable film, special handling is required during the processing steps in the forming machine to ensure proper registration of the substrate cavities, the droplets, and the temperature indicia and to avoid any adverse heating of the crystal droplets during heat-sealing of the protective cover layer to the substrate layer. To this end the substrate film is provided with wide margins to provide strength in handling and to avoid stretching and heat deformation in the central portion of the film which region is used in forming the thermometers. At the successive marking, filling and heat-sealing stations of the machine special vacuum chucks are provided to hold the film against movement or stretching and the chuck at the heat-sealing station is particularly adapted for cooling the film to avoid unwanted heating of the crystal droplets. Between the processing stations special guides are disposed for precisely directing the movement of the film, and a cam-operated transporter is used for precisely indexing the movement of the film.

BRIEF DESCRIPTION OF THE DRAWINGS

FIG. 1 is a diagrammatic view of a thermometer manufacturing machine in accordance with the present invention.

FIG. 2 is an exploded view of a thermometer manufactured by the machine of FIG. 1.

DETAILED DESCRIPTION OF THE INVENTION

Figure 3:
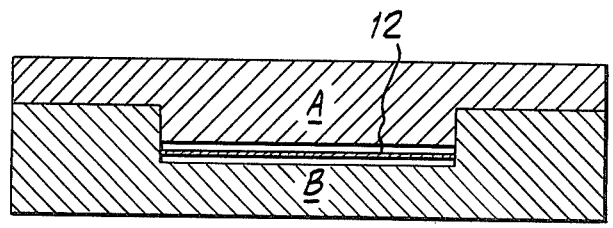
FIG. 3 is a cross sectional view of one form of web guide used in the machine of FIG. 1.

A method and means in accordance with the present invention is generally illustrated in FIG. 1 which shows a typical form-fill-seal machine 1 that has been adapted for the particular purpose of precision manufacturing disposable liquid-crystal-containing thermometers such as shown in FIG. 2. The machine 1 consists of a series of process stations, namely, a base stock-unwind station 2, a forming or embossing station 3, a hot-stamping station 4, a liquid-crystal-filling station 5, a cover stock heat-selling station 6, a blanking station 7, a trim stock rewind station 8, and a packoff station 9. An unwind device 10 for the cover stock is disposed above the heat-sealing station 6 and supplies cover stock 11 to the upper surface of the base stock web 12 just prior to its entering the station for the heat-sealing operation.

The particular components of a disposable liquid-crystal-containing thermometer that may be produced by the machine are shown in detail in FIG. 2. The thermometer 20 consists of a substrate in the form of a base stock 22 composed of aluminum foil with a polymer film backing and a black polymer coating. This stock 22 is provided in precision-slit coils or rolls 12a from which it is unwound at the unwinding station 2. The black polymer coating may be marked with an appropriate design of leaf material, which design includes a matrix of temperature-identifying numbers 22a. The marking is accomplished at the hot-stamping station 4. The base stock 22 is embossed with indentations in the form of strenghening ribs 22b and a matrix of dimples 22c which constitute cavities for receiving a set of liquid-crystal drops 23. The embossing is performed at the forming station 3 which may be located before the hot-stamping station 4, as shown in FIG 1, or alternatively, following the hot-stamping station. The series of individual liquid-crystal drops 23 are placed in the appropriate cavities 22c of the matrix at the filling station 5. A protective transparent film cover stock 24, is disposed on the upper surface of the base stock 22 extending over the series of liquid-crystal drops 23, holding them in place, and is attached to the base stock 22 adhesively or preferably by heat-sealing at the cover stock heat-sealing station 6. As the respective stocks are provided in the form of continuous webs for mass production, successive thermometers are punched from the webs at the blanking station 7. Each thermometer 20 may be of the order of 3½ inches in length and ½ inch in width.

In view of the comparatively small size of the thermometer 20 and particularly the size and arrangement of the liquid-crystal drops 23 and the temperature-identifying marks 22a thereon, the manufacturing operation must be carried out with extreme precision. Such precision is made difficult, however, by the nature and quality of the materials making up the thermometer. Firstly, the substrate or base stock material is somewhat flexible, so that care must be taken to avoid stretching or distorting the base stock web during the various operations performed upon it if precise registration of the components is to be achieve. Further, as the liquid crystal drops are temperature sensitive, care must be taken during heat-sealing of the cover stock to the base stock to avoid unwanted heating of the crystals. In accordance with the present invention, to overcome these difficulties a base stock web with a width about three times that required for making the thermometer is used to facilitate handling without stretching and to assist heat dissipation during the heat-sealing step. In addition, special web guides and vacuum chucks are provided along with a cam-operated indexing transporter for precisely advancing and holding the base stock web during processing. A preferred embodiment of the machine incorporating the improved features for accomplishing this manufacture is shown in FIG. 1 and is constructed and operated in the following manner.

The substrate or base stock 12 is mounted in the form of a precision-slit roll 12a at one end of the machine 1. The stock 12 is intermittently unwound from the roll 12a, under a constant tension, by a suitable transporter 13, disposed between the heat-sealing station 6 and the blanking station 7, and proceeds from the unwinding station 2, in the form of an advancing web, through the machine to the trim stock rewind station 8 at the opposite end. This base stock is relatively thin, of a thickness from about 0.002 inches to 0.005 inches, and the width of the web is approximately 2.17 inches or about three times the ¾ inch width used in the forming of the thermometers 20. The constant tension applied to the advancing web is in the range between ¼ to 2 pounds per mil inch, and the web is carefully guided laterally to minimize drag and thus avoid any irregular stretching. To this end the advancing web is directed by special guides in passing through the various process stations, and since the unwinding and advancing action is intermittent, the particular portions of the web, while being operated upon at the respective processing stations, are held against any relative lateral motion by special vacuum chucks.

Figure 4:
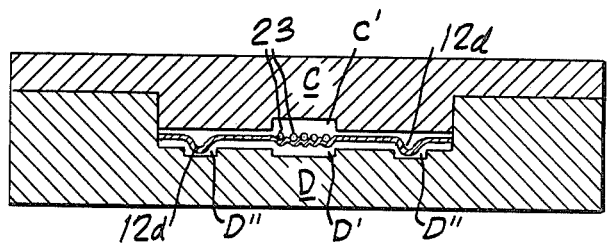
FIG. 4 is a cross sectional view of another form of web guide used in the machine of FIG. 1.

More particularly, the components of the special guides used are shown in detail in FIGS. 3 and 4. The guide shown in FIG. 3 is suitable for use on the unprocessed web at the entrance to the forming station 3 and comprises a base member B with a cooperating top or cover member A defining a channel between them. This guide may be approximately 2 to 4 inches long and has a channel width of 2.175 inches for precisely accommodating the 2.170 inch web 12 therein. The vertical clearance in the channel between the members may be about 0.010 inches. The guide shown in FIG. 4 is particularly suitable for use at the exit of the filling station 5 and comprises a base member D with a cooperating top member C. Base member D is similar in construction to base member B but additionally has three longitudinal slots formed therein. The central slot D' accommodates the embossed central portion of the web in which the thermometer apparatus is formed, and the exterior slots D" accommodate embossed dimples 12d in the respective lateral edge portions of the web. The top or cover member C is similar in construction to the member A but additionally has a central slot C' therein for accommodating the passage of the liquid-crystal drops 23 which have been deposited in the appropriate web cavities and which are exposed at the exit of the filling station 5. The form of the various guides disposed at the entrances and exits of the respective stations along the machine are indicated in FIG. 1 by appropriate letters corresponding to the members described above.

As also seen in FIG. 1, the unwinding web 12, after passing over a set of guiding rollers 14, is passed through a guide AB such as shown in FIG. 3 into the forming station 4. At the forming station the base stock web 12 is embossed to form therein support ribs 22b and cavities 22c for receiving the liquid-cyrstal drops 23. An appropriate logo or other indicia may also be formed in the central or thermometer portion of the web, and the lateral edge portions are formed with a series of spaced positioning dimples 12d, such as shown in section in FIG. 4 and in detail in FIG. 6. The desired embossing may be performed by a device 34 using a conventional punch, stripper hold-down plate, and bottomless cavity die with a forming depth adjustable between 0 and 0.15 inches.

Before or after embossing, the base stock 12 is stamped with a marking material 41 such as a gold or other contrasting color leaf at the hot-stamping station 4. The marking may be in the form of an attractive design or trademark, but particularly includes the set of numbers 22a for temperature identification. The identification numbers 22a are appropriately marked adjacent the columns and rows of cavities 22c which are to receive the liquid-crystal drops 23. This indicia is subsequently used to read temperature in accordance with changes in color of the liquid crystals when the thermometer is used. The stamping may be done by a conventional hot leaf stamper device 44 which is capable of the precision transfer of appropriate markings to the base stock 12 in less than 0.75 seconds. Alternatively, the various indicia may be printed on the clear cover stock 11 as will be hereinafter described. During the stamping operation the web 12 is held in position by a vacuum chuck 25' which will also be described below.

The prepared portion of the base stock web next passes through a set of AD guides to the filling station 5. At station 5 a multihead filler device 54, such as disclosed in copending Pat. application Ser. No. 920,446, fills each cavity 22c in the base stock with a liquid-crystal drop of a quantity of from 0.1 to 1.0 microliters with an accuracy of ±5%. During the filling operation the filling device 54 may remain stationary while the web is raised somewhat to contact the liquid-crystal drops 23 fed to and formed on a matrix of feeding nozzles 51 which register with the matrix of cavities 22c in the base stock. Alternatively, the feeding nozzles 51 may be moved downwardly to deposit the drops on the web. In either event, to ensure precise registration a second transporter, of the same type as conventional cam-operated primary transporter 13 shown in FIG. 5, may be disposed at the entrance of the filling station 5 in combination with holddown roller guides located at the exit of the station. However, the use of the single transporter 13 and of guides AD and CD at the respective entrance and exit of the filling station 5 is preferred since the guides are low drag devices and any frictional distortion which may be caused by the rollers is avoided. With the latter arrangement a vacuum chuck 25" is used to hold the web during the filling operation.

As previously mentioned, the margins of the base stock web 12 are dimpled at the forming station, and these dimples 12d cooperate with suction openings in the vacuum chuck 25" disposed beneath the web in the filling station 5. The vacuum chuck 25" thus holds the base stock web 12 against relative lateral movement while raising it into contact with the feed nozzles 51 of the filling device 54 and prevents stretching of the thermometer portion of the web. Vacuum chuck 25" is similar to chuck 25' at the hot-stamping station 4 to similarly ensure against stretching and lateral movement of the web during the stamping of the markings thereon. The details of these vacuum chucks will be described presently in connection with FIG. 6 and the heat-sealing operation.

After the liquid-crystal drops 23 have been disposed in the cavities 22c at station 5, the base stock web 12 is advanced along through a guide CD to the cover stock heat-sealing station. Upon the web's entering the station 6, the cover stock 11 is fed in the form of a clear film under constant tension from a roll 11a above the station to the top surface of the base stock 12. The roll 11a is mounted on a suitable unwinding device 10, and as previously noted, the cover stock which is of a clear film may be preprinted with the required indicia if it is desired to eliminate the hot-stamping station 4. However, the use of the hot-stamping station is preferred for ensuring proper registration of the indicia and components of the thermometer since then stretching of the cover stock need not also be carefully controlled.

Figure 6:
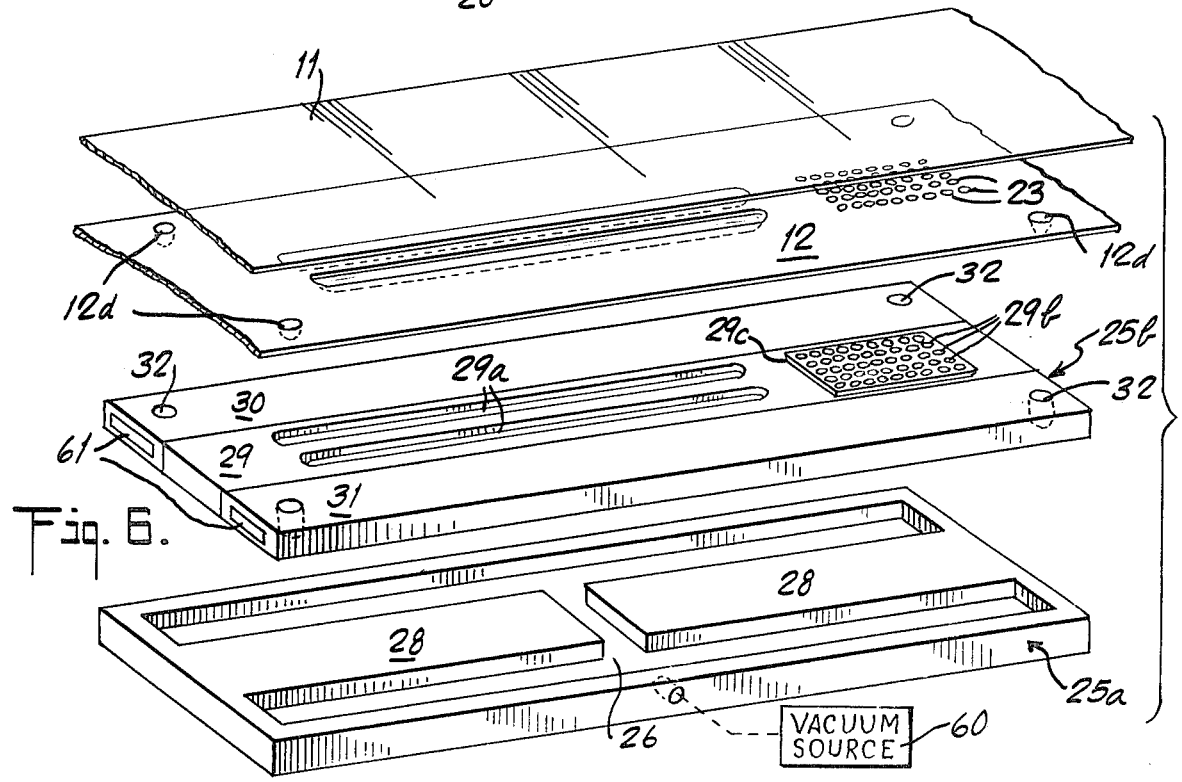
FIG. 6 is an exploded view illustrating the cooperation between the film webs and the web holding vacuum chuck at the heat-sealing station of the machine of FIG. 1.

While sealing of the cover stock 11 to the base stock 12 may be done adhesively, heat-sealing is preferred, but must be carefully carried out to avoid unwanted heating of the liquid-crystal drops 23. For this purpose, a special vacuum chuck such as shown in FIG. 6 is provided. This vacuum chuck 25 essentially comprises a vacuum chamber base member 25a and a cover member 25b. The base member 25a is similar to the base members of the vacuum chucks 25' and 25", respectively disposed at the hot-stamping station 4 and the filling station 5, in that a chamber 26 is provided therein which communicates through an aperture 17 with a source of vacuum 60. However, unlike the base members of chucks 25' and 25", member 25a has two central support islands 28 formed therein which cooperate with the central portion 29 of the cover member 25b. Cover member 25b is formed in three parts consisting of central portion 29 which is of a non-heat-conducting material, and side portions 30 and 31 which are of a heat-conductive material such as brass. The side portions 30 and 31 are provided with internal chambers 61 for the passage of cooling water so as to act as chill blocks dissipating heat during the heat-sealing operation. The central portion 29 is provided with grooves 29a for accomodating the supporting ribs 22b of the thermometer, and a set of cavities 29b for accommodating the liquid-crystal cavities 22c in the thermometer. While the chucks 25' and 25" have single piece cover members with flat top surfaces in which the appropriate grooves and cavities are formed, central portion 29 of vacuum chuck 25 has the cavities 29b formed in a platform portion 29c which is raised about ½ of one thousands of an inch above the level of the remaining surface of cover member 25b.

During the heat-sealing operation the heat-sealing head 64 presses down on the central portion of the cooperating cover stock and base stock webs, appropriately heat-sealing them together in all areas except at the crystal containing cavities 22c. The raised platform portion 29c provides for positive sealing of the cover film around the crystal-containing cavities 22c, and the laminating web structure cushions the cavities during the heat-sealing-compression. In addition, the support islands 28 prevent deflection of the central portion 29 of the cover member 25b into the vacuum chamber 26 during this heat-sealing compression. The heat is rapidly dissipated by the chill block sections 30 and 31 of the cover member 25b using the cooling water passing therethrough to avoid any unwanted heat buildup which would adversely affect the liquid-crystal drops 23. Heat-sealing is only performed in the central portion of the webs in an approximately ¾ inch wide band, and the approximately ¾ inch wide edge portions of the cover stock 11 and the base stock 12 remain unsealed and assist in heat dissipation. Thus, unwanted stretching of the web is minimized. The heating temperature of the heat sealing head is controlled to about ±1%, and this operation is capable of less than 0.005 inch web distortion at the sealing temperature. All of the vacuum chucks have edge apertures 32 in their cover members which cooperate with the dimples 12d on the lateral edges of the web 12 to communicate the vacuum to the web for holding the latter precisely in place during the successive operations at the respective stations.

Figure 5:
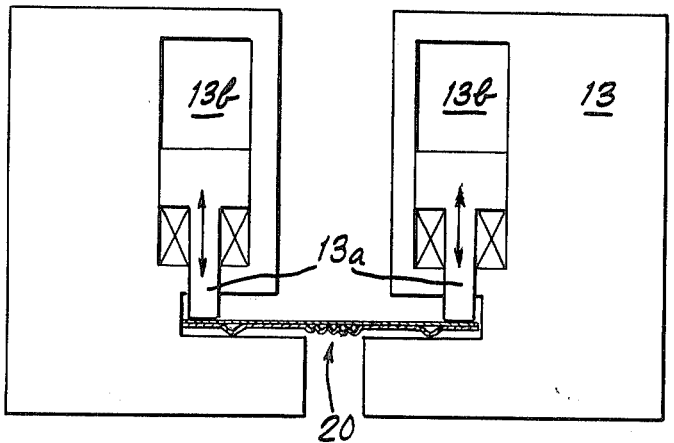
FIG. 5 is a diagrammatic view partly in section illustrating the web transporter in the machine of FIG. 1.

With the cover stock 11 sealed to the base stock 12 in the central portion, the composite web is transported out of the heat-sealing station 6 by the transporter 13 as previously noted. Transporter 13 as shown in FIG. 5 comprises two air-driven clamps 13a which when actuated by their respective air cylinders 13b securely grip the lateral edges of the web. The reciprocating action of the transporter advances the web about 4 inches during each forward stroke. The reciprocating action of the transporter is cam operated and programmed to produce intitial slow movement increasing to the highest speed during the middle portion of the forward stroke and slowly decreasing to a stop so that any abrupt movement of the web is minimized. This controlled movement and secure gripping of the web ensures proper registration of the appropriate web portions at the various processing stations.

The composite web is passed in indexed steps to the blanking station 7 where an air-driven blanking die 7a punches or knocks out a finished thermometer 20 from the interior of the web. The blanking die 7a may be of a conventional type with a compound punch having a vacuum which holds the thermometer against the punch until it is free of the die whereupon the thermometer is airblown off the punch and deposited onto a lower conveyor 15. Each thermometer 20 is deposited onto the conveyor 15 which takes it to the pack-off station 9 for packing by a suitable pack-off system.

The remaining portion of the composite web or trim after the thermometer is knocked out is fed to a rewind station 8 where it is wound into the form of a roll 8a for recycling or disposal.

The blanking die system 7a is made compatible with the pack-off system which in turn may be selected to be compatible with the desired carton, cassette or pouch to be used for packaging the thermometers.

It will be seen that a result of the use of a comparatively wide web in combination with the disclosed guiding and holding devices, problems with regard to stock stretching, strength and heat deformation are avoided, so that disposable thermometers having precisely registered components may be mass produced.

The guides are precisely aligned, and web movement and station spacing is adjusted to permit rapid and accurate production.

I claim:

1. Apparatus for producing from stretchable film a marked laminated package containing a product with precise registration between the product and the marking comprising:

first supply means for providing a continuous web of a coated stretchable substrate film;

means for guiding said substrate web along a processing path said guide means comprising a base member and a cover member having aperture means therebetween for precisely passing said substrate web, and said cover member comprises means for passing said product element on said web;

means for operating on said substrate web along said processing path including:

means for depositing at least one product element to be packaged on said substrate web;

second supply means for providing a continuous web of a cover film;

transporter means for advancing said webs together along said processing path with indexed movement;

means for sealing said cover film to said substrate film with said product element disposed therebetween to form a laminated package containing said product element; and means for separating said laminated package from said webs; and wherein said substrate film comprises:

central portion means for forming a layer of said laminated package; and respective edge portion means each integral with and at least as wide as central portion means for cooperating with said guiding means.

2. Apparatus as in claim 1 wherein said sealing means comprises means for heat-sealing said cover film to said central portion means and said guiding means comprises vacuum chuck means for vacuum holding said edge portion means during the heat-sealing operation.

3. Apparatus as in claim 2 wherein said vacuum chuck means comprises central means for accommodating said central portion means and edge means for cooling said substrate web.

4. Apparatus as in claim 1 wherein said operating means further comprises means for dimpling said substrate web to provide a cavity therein for receiving said product element therein.

5. Apparatus as in claim 4 wherein said operating means further comprises means for marking said substrate web in registration with said cavity.

6. Apparatus as in claim 5 wherein said guiding means includes vacuum chuck means for holding said substrate web during marking.

7. Apparatus as in claim 1 wherein said operating means further comprises means for dimpling said respective edge portion means, and said guiding means includes vacuum chuck means cooperating with the dimples to hold said substrate web against stretching when being operated upon.

8. Apparatus as in claim 1 wherein said guiding means includes vacuum chuck means for holding said respective edge portion means at said depositing means.

9. Apparatus as in claim 1 wherein said substrate film comprises a foil of aluminum having a polymer film backing and opaque polymer coating.

10. Method for producing from stretchable film a marked laminated package containing a product with precise registration between the product and the marking comprising the steps of:

supply a continuous web of a coated stretchable substrate film along a processing path, said web having a central portion to be operated upon and integral edge portions, at least as wide as said central portion, to be used for handling said web;

advancing said substrate web along said path with indexed movement by gripping said edge portions while carefully guiding it laterally in the path by guide means comprising a base member and a cover member having aperture means therebetween for precisely passing said substrate web, and said cover member comprises means for passing said product element on said web;

operating on said web at respective stations along said path including the steps of:

marking the central portion of said substrate web with indicia;

depositing at least one product element to be packaged on said central portion of said substrate web in registration with said indicia;

providing a continuous web of a cover film and sealing it to said substrate web in said central portion with said product element disposed therebetween to form a laiminated package containing said product element;

holding said edge portions of said substrate web at the operating stations during each of said operating steps; and separating said laminated package from said webs.

11. Method of claim 10 wherein said holding step is carried out by means of a vacuum.

12. Method as in claim 10 wherein said sealing step is carried out by applying heat.

13. Method as in claim 12 comprising the further step of cooling said edge portions during heat-sealing.

14. Method as in claim 10 wherein said operating steps further comprise dimpling said edge portions of said substrate web by which dimples said substrate web is held against stretching when being operated upon.

15. Method as in claim 14 wherein said central portion of said substrate web is dimpled during said dimpling operation in registration with said indicia to provide a cavity therein for receiving said product element therein.

16. Method as in claim 10 wherein said substrate web is guided by passing it through a series of precisely aligned and closely accommodating apertures.

* * * * *